United States Patent [19]

Evans

[11] Patent Number: 4,544,395

[45] Date of Patent: Oct. 1, 1985

[54] CATIONIC SURFACE COATING OF FLAT GLASS

[75] Inventor: Brian Evans, Formby, England

[73] Assignee: Pilkington Brothers Limited, England

[21] Appl. No.: 239,923

[22] Filed: Mar. 3, 1981

Related U.S. Application Data

[63] Continuation of Ser. No. 67,501, Aug. 17, 1979, abandoned.

[51] Int. Cl.⁴ .............................................. C03C 17/28
[52] U.S. Cl. ......................................... 65/60.3; 65/24; 65/86; 134/2; 134/15
[58] Field of Search ................. 134/2, 264, 15; 65/24, 65/86, 60.3

[56] References Cited

U.S. PATENT DOCUMENTS

| | | | |
|---|---|---|---|
| 3,681,122 | 8/1972 | Domicone et al. | 134/2 X |
| 3,850,679 | 11/1974 | Sopko et al. | 65/60 |
| 4,033,785 | 7/1977 | Gibbs | 134/15 |
| 4,156,619 | 5/1979 | Griesshammer | 134/2 |

FOREIGN PATENT DOCUMENTS 7111112  2/1972  Netherlands ........................ 65/60.3

Primary Examiner—Arthur Kellogg
Attorney, Agent, or Firm—Sughrue, Mion, Zinn, Macpeak, and Seas

[57] ABSTRACT

A method of treating flat glass to reduce its vulnerability to scratching, e.g. during storage and/or transit, wherein a transparent film of a cationic surface active agent is adsorbed on the glass by applying an aqueous solution of the surface active agent to the glass on the production line and drying the glass. The solution may be applied to the glass after is has been washed, near the end of the production line, using for example an anionic surface active agent as detergent. Alternatively, a solution containing both a cationic surface active agent and an nonionic surface active agent as detergent may be applied to the glass to wash it, followed by rinsing with water and drying.

23 Claims, 1 Drawing Figure

U.S. Patent    Oct. 1, 1985    4,544,395
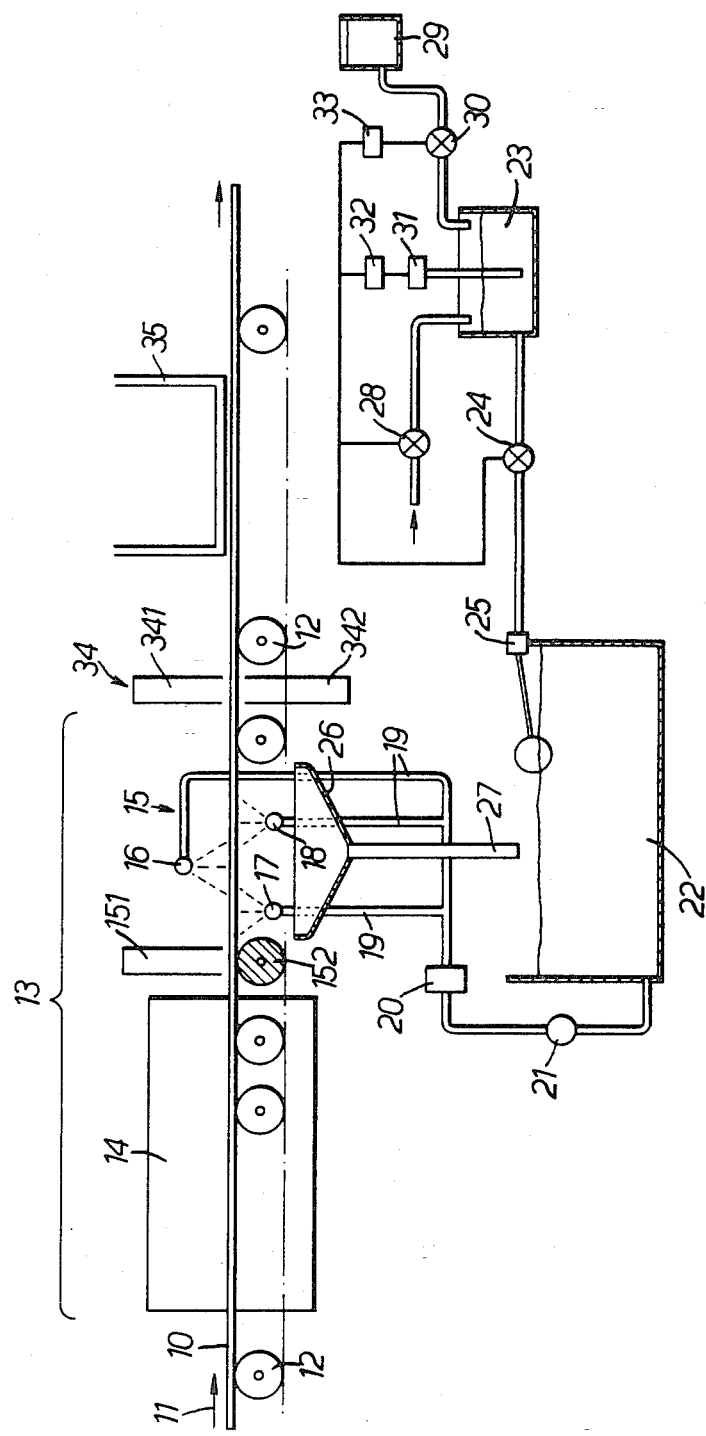

CATIONIC SURFACE COATING OF FLAT GLASS

This is a continuation of application Ser. No. 67,501, filed Aug. 17, 1979, abandoned.

BACKGROUND OF THE INVENTION

1. Field of the Invention

This invention relates to the treatment of flat glass to reduce its vulnerability to scratching.

2. Description of the Prior Art

Flat glass is usually manufactured as a continuous ribbon which is washed and then cut, either to standard sizes or to the size required by the customer, the cut sheets being then stacked for storage and/or transit. When it is desired to cut the sheets further before despatch from the factory, they are generally cut and then washed and rinsed as cut sheets. Even with careful washing it is in practice difficult to eliminate all contaminants and debris, such as fragments of broken glass (cullet) produced during cutting, or particles of a hard nature such as silica (sand) e.g. from the glass-making materials. The presence of such fragments or particles between the stacked sheets can cause scratching even where interleaving materials are used, and further damage can be caused by impact of the corner of one sheet against another during handling.

SUMMARY OF THE INVENTION

It is an object of the invention to provide a method and apparatus for treating flat glass to reduce its vulnerability to such scratching.

According to the present invention, a method of treating flat glass to reduce its vulnerability to scratching comprises the steps of advancing the glass along a production line on which the glass has been made to a treatment station forming part of the production line, applying an aqueous solution of a cationic surface active agent to at least one major surface of the glass at the treatment station, and thereafter removing the glass from the treatment station and drying the glass so as to leave a transparent film of the surface active agent adsorbed on the glass surface.

It is important that the treatment should be carried out on the production line to provide protection at an early stage. The method of the present invention is especially advantageous for use in the protection of raw glass prior to processing such as toughening, bonding or laminating, although it may also, if desired, be used for the protection of glass which is not subject to any subsequent processing.

The cationic nature of the surface active agent ensures that it will be firmly adsorbed on the glass surface. It appears that the surface active agent acts in two ways. First, it reduces friction between adjacent sheets and any fragments or particles between them and so reduces the incidence of scratching. Second, it is believed that the presence of the surface active agent also reduces the tendency of particles to adhere to the glass surface and thus be present and liable to cause scratches. The method can be easily and economically carried out and produces a useful reduction in scratching.

Preferably, the solution of cationic surface active agent is applied to the glass after it has been washed, near the end of the production line, using for example an anionic surface active agent as detergent.

Cationic surface active agents are not normally used for washing glass because their detergent activity is inferior to that of anionic or non-ionic surface active agents. It may nevertheless be possible, in an alternative method of carrying out the invention, to utilise the slight detergent properties of the cationic surface active agent by employing a method wherein a solution containing both a cationic surface active agent and non-ionic surface active agent as detergent, is applied to the glass so as to wash the glass surface, and this washing step is followed by a step of rinsing with water before the glass is dried.

The cationic surface active agent is preferably one which is positively charged in the aqueous solution, e.g. a quaternary ammonium salt such as an alkyl dimethyl benzyl ammonium chloride.

The concentration of the solution of the cationic surface active agent is not critical. It is believed that, provided a monomolecular layer of the cationic surface active agent is adhered to the whole treated surface of the glass, the addition of further surface active agent does not result in any significant improvement in protection against scratching. The concentration of solution required to deposit a monomolecular layer will, of course, depend on the time of contact between the solution and the glass. The shorter the contact time, the greater the concentration of solution required for good results. Thus, whilst weaker solutions may be used if the contact time is sufficient, it is believed that, for the on-line treatment of float glass a concentration of 0.001% or more is desirable. There is generally nothing to be gained by using solution having a concentration greater than, say, 2%, unless the contact time is very short. However, if desired, higher concentrations, for example up to 10% or more, may be used, although such highly concentrated solutions may be viscous and therefore difficult to apply. In a particular example, the solution may contain of the order of 0.02% by volume of the cationic surface active agent. For this purpose, a concentrated, substantially 10% by volume solution of the cationic surface active agent may be metered into water at a dilution ratio of substantially 1:500.

For purposes of economy, excess treatment solution applied to the glass may be collected and re-cycled. However, to prevent an excessive build-up of contaminants in the solution, a proportion of the solution being re-cycled may be discarded.

Preferably, at the treatment station, the solution of cationic surface active agent is applied to both major surfaces of the glass, although useful results may be achieved by treating one major surface only. In many cases, the application may conveniently be carried out by spraying or by using rollers in contact with a source of solution and the glass. In cases where the glass is supported in a substantially horizontal plane at the treatment station, and both surfaces are treated by spraying, it is generally preferable to use a larger number of spraying elements beneath the glass than above it to compensate for the faster removal of solution from the lower surface by gravity.

In a preferred method of treating the upper surface of a horizontal ribbon of glass, the solution is supplied on to the upper surface and confined so that it forms a pool on that upper surface. The use of a pool of substantially constant length (measured in the direction of ribbon movement) provides substantially uniform treatment of the ribbon surface. The movement of the ribbon will generally be sufficient to prevent the pool from spreading upstream against the direction of ribbon movement. The pool may be conveniently confined against downstream movement by the use of an air knife, which effects the drying of the glass. Excess solution may overflow at the edges of the ribbon, and if desired, be collected and re-cycled.

The drying of the glass may alternatively be effected in any other conventional manner. For example in suitable circumstances, by simply allowing the glass to dry under ambient conditions.

The invention also resides in apparatus for treating flat glass to reduce its vulnerability to scratching, characterised in that the treatment apparatus forms part of the production line on which the glass is made and comprises means for supplying a solution of treatment agent to at least one major surface of the glass, a collector for collecting solution flowing from the glass, means for recycling at least a proportion of solution from the collector to the supply means and a reservoir arranged for connection to the supply means for holding fresh treatment solution and supplying it to the supply means.

Preferably the apparatus comprises a source of concentrated treatment agent and a source of water each arranged to deliver predetermined quantities to the reservoir.

Although the apparatus is particularly suitable for the application of a treatment agent which is a cationic surface active agent in aqueous solution, it will be appreciated that it may also be used for applying solutions of other treatment agents to glass on the production line.

BRIEF DESCRIPTION OF THE DRAWING

The accompanying drawing shows in diagrammatic form an apparatus employed for putting the invention into effect.

DETAILED DESCRIPTION OF THE INVENTION

As illustrated in the drawing, a continuous ribbon of glass 10 produced by the float process is advanced along the production line in the direction of the arrow 11 over a roller conveyor, of which only a few of the individual rollers 12 are illustrated.

The glass ribbon 10 is advanced over the roller conveyor 12 to a treatment station 13 where it is washed and treated to reduce its vulnerability to scratching. Washing is carried out by an apparatus 14 of known type, the details of which are not relevant to the present invention and which is therefore merely indicated by a block. The apparatus 14 may include provision for the supply of a detergent solution, e.g. of a non-ionic or anionic surface active agent, and scrubbers, acting on both the major surfaces of the glass ribbon 10, i.e. the upper and lower surfaces.

On leaving the washing apparatus 14, the glass ribbon 10 passes to a treatment apparatus 15, at which the cationic surface active agent is applied to the glass in solution in water. The treatment apparatus is shown here as comprising three horizontal spray pipes 16, 17, 18 disposed transversely across the path of movement of the glass ribbon 10, the pipe 16 being above the plane of the ribbon and the pipes 17 and 18 below it. The precise number of spray pipes may be varied, but the number of pipes below the plane of the glass ribbon 10 will generally exceed the number above it, in order to compensate for the fact that the solution applied to the lower surface of the ribbon drips off it rapidly, whereas the solution applied to the upper side forms a pool which remains in contact with the upper side for as long as it remains within the treatment apparatus 15, so that it is necessary to apply more solution to the underside to achieve a substantially equal equivalent contact time of the solution with both the upper and lower surfaces.

The treatment apparatus 15 is bounded, on the inlet side, by a low pressure air knife device 151 acting on the upper surface of the glass ribbon 10 and a squeegee roller 152 acting on the underside of the ribbon, which prevent or reduce carry-over of water from the washing apparatus 14. On the outlet side, it is bounded by a drying apparatus 34 comprising a pair of transverse air knife devices 341 and 342 acting on the upper and lower sides of the ribbon 10.

The upper air knife 341 effectively confines the pool of treatment solution on the upper side of the moving ribbon 10 against downstream movement. The movement of the ribbon is generally sufficient to prevent upstream movement of the pool, so that it retains a substantially constant length.

Each of the three spray pipes 16, 17, 18 is connected through a respective feed pipe 19, a filter 20 and a pump 21 to a main treatment solution supply tank 22. The tank 22 is supplied with solution from a reservoir 23 through a solenoid controlled valve 24 and a float valve 25. The tank 22 also receives the solution which has dripped off the upper and undersides of the glass ribbon 12, through a collecting trough 26 and return pipe 27, for recycling. The reservoir 23 is supplied with substantially pure water through a solenoid controlled valve 28 and with a concentrated (e.g. 10% v/v) solution of the cationic surface active agent from a header tank 29 through a solenoid controlled valve 30. The level of the treatment solution in reservoir 23 is sensed by a probe 31 electrically connected to a level detector 32 which is in turn connected to the solenoid controlled valves 24, 28 and, through a time delay device 33, to valve 30. The detector 32 and valves 28, 30 are adjusted to meter the supplies of the concentrated solution of surface active agent and water (e.g. at a ratio of 500:1) so as to ensure that the concentration of cationic surface active agent in the treatment solution in reservoir 23 is as desired, e.g. 0.02% v/v.

From the treatment apparatus 15, the glass ribbon 10 passes to the drying apparatus 34, and thence to a scanner 35 which inspects the ribbon 10 for faults, before the ribbon is cut and the cut sheets are picked up and stacked in conventional manner for storage or transit.

In this manner a thin film of cationic surface active agent is adsorbed on both major surfaces of the cut glass sheet, and it has been found that this results in a useful reduction in the incidence of scratching on the stacked sheets. Also, it has been found that, when sheets of glass treated according to the invention are subsequently laminated together, with the treated surfaces inwards, by a process involving heating a preformed laminate, the rate of rejection of the finished laminates as a result of cullet distortion is lower than when untreated glass is used. "Cullent distortion" is the term used to describe the effect observed when particles of glass adhere to the surface to be laminated and, during lamination, become welded to the glass surface, resulting in a visible discontinuity.

Instead of using the transverse spray pipes 16, 17, 18 described above, the solution of cationic surface active agent may be applied to the glass surfaces by rollers in contact with a source of the solution and with the glass.

In an alternative embodiment of the invention, the cationic surface active agent in included with a nonionic surface active agent used as the detergent in the washing apparatus 14. In this case, it is generally convenient to use a more concentrated solution to provide a satisfactory effect. For example, an aqueous solution containing 0.25% of the cationic surface active agent in addition to the non-ionic surface active agent, may be applied to both major surfaces of the glass ribbon 10 in the apparatus 14. The solution may be collected and recirculated after use. The treatment apparatus 15 is then used to perform a final rinse with water which may remove any excess of the cationic surface active agent.

The chemical structure of the cationic surface active agent used is not critical but it is preferred to use a cationic surface active agent which is positively charged in the solution in which it is used. The positive charge enhances the tendency of the surface active agent to be strongly adsorbed on the glass surface. It is therefore generally convenient to use a surface active agent which is a quaternary ammonium salt, since such salts are generally soluble in water over a wide range of pH values and the quaternary ammonium group is positively charged in solution. On the other hand, many primary, secondary and tertiary amines which are cationic surface active agents are water soluble only in alkaline solutions and are not positively charged in aqueous solution. Some cationic surface active agents, for example, ethoxylated amines, are soluble in water at both acid and alkaline pHs, but are positively charged only in acid solutions. If used, such amines are preferably used in acid solutions. A preferred cationic surface active agent which has been used in practising the invention is an alkyl dimethyl benzyl ammonium chloride, a quaternary ammonium salt, sold by Lankro Chemicals Limited, of Manchester, England, under the Trade name QUADRILAN BP.

Alternative cationic surface active agents which may be used are:

(1) An ethoxylated amine sold under the Trade name ETHOMEEN C/25 by Armour Hess Chemicals Limited of Harrogate, Yorkshire, England, and having the formula:

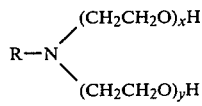

where R represents a fatty alkyl chain derived from coconut oil and the sum $(x+y)$ is approximately 15.

(2) A quaternerised ethoxylated amine chloride salt sold under the name ETHOQUAD C/12 by Armour Hess Chemicals Limited and having the formula:

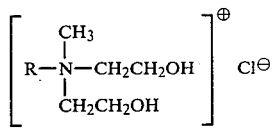

where R represents a fatty alkyl chain derived from coconut oil.

(3) A quaternerised ethoxylated amine chloride salt sold under the name ETHOQUAD O/12 by Armour Hess Chemicals Limited, having the same formula as ETHOQUAD C/12 except that R represents a fatty alkyl chain derived from soya bean oil.

(4) A quaternerised ethoxylated amine chloride salt sold under the name ETHOQUAD C/25 by Armour Hess Chemicals Limited and having the formula:

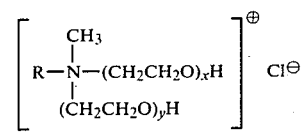

where R represents a fatty alkyl chain derived from coconut oil and the sum $(x+y)$ is approximately 15.

(5) Acetate salts of primary amines having long chain alkyl groups derived from mixtures of fatty acids, sold under the Trade name ARMAC C and ARMAC T by Armour Hess Chemicals Limited.

(6) Bis-(2-hydroxyethyl)alkylamine oxides sold under the Trade names AROMOX C12/W and AROMOX DMCDW by Armour Hess Chemicals Limited.

The compounds referred to under (6) are amphoteric surface active agents, being cationic in solutions of low pH values and anionic in high pH solutions.

Whilst the process of the invention has been specifically described with reference to the on-line treatment of a ribbon of flat glass, it will be appreciated that it may also be applied to the on-line treatment of sheet glass made by an upward drawing process or glass made by a rolling process. It is particularly applicable to the treatment of rolled plate glass, because the unavoidably uneven surface of such glass renders it particularly vulnerable to scratching.

I claim:

1. A method for treating flat glass to reduce its vulnerability to scratching which comprises the steps of advancing the glass along a production line on which the glass has been made to a treatment station forming part of the production line, applying an aqueous solution which consists of a cationic surface active agent to at least one major surface of the glass at the treatment station, and thereafter removing the glass from the treatment station and drying the glass so as to leave a transparent film consisting of surface active agent adsorbed on the glass surface.

2. A method of treating flat glass according to claim 1 wherein the application of the solution of cationic surface active agent to the glass is effected after the glass has been washed, near the end of the production line.

3. A method of treating flat glass according to claim 1, characterized in that the cationic surface active agent is one which is positively charged in the aqueous solution.

4. A method of treating flat glass according to claim 3, characterized in that the cationic surface active agent is a quaternary ammonium salt.

5. A method of treating flat glass according to claim 4, characterized in that the cationic surface active agent is an alkyl dimethyl benzyl ammonium chloride.

6. A method of treating flat glass according to claim 1, characterized in that the solution contains from 0.001% to 2% of the cationic surface active agent.

7. A method of treating flat glass according to claim 1, characterized in that the solution contains on the order of 0.02% by volume of the cationic surface active agent.

8. A method of treating flat glass according to claim 7, characterized in that a concentrated, substantially 10% by volume, solution of the cationic surface active agent is metered into a treatment solution supply tank at a dilution ratio of substantially 1:500, and then the diluted solution of cationic surface active agent is applied to said flat glass.

9. A method of treating flat glass according to claim 1, characterized in that the solution is applied by spraying from spray pipes extending transversely across the production line.

10. A method of treating flat glass according to claim 1, characterized in that the solution is applied by means of rollers in contact with a source of solution and the glass.

11. A method of treating flat glass according to claim 1, characterized in that, at the treatment station, the solution of cationic surface active agent is applied to both major surfaces of the glass.

12. A method of treating flat glass according to claim 11, characterized in that the glass is supported in a substantially horizontal plane at the treatment station, and the application is effected using a larger number of application elements beneath the glass than above it to compensate for the faster removal of solution from the lower surface by gravity.

13. A method of treating flat glass according to claim 1, characterized in that the treatment is applied to the upper surface of a horizontal ribbon of glass, the solution of cationic surface active agent being supplied on to the upper surface and confined so that it forms a pool thereon.

14. A method of treating flat glass according to claim 13, characterized in that the pool is confined against movement downstream in the direction of ribbon movement by the use of an air knife, which effects the drying of the glass.

15. A method for treating flat glass to reduce its vulnerability to scratching which comprises the steps of advancing the glass along a production line on which the glass has been made to a treatment station forming part of the production line, applying an aqueous solution which consists of a cationic surface active agent and a non-ionic surface active agent to at least one major surface of the glass at the treatment station, and thereafter removing the glass from the treatment station and drying the glass so as to leave a transparent film consisting of surface active agent adsorbed on the glass surface.

16. A method of treating flat glass according to claim 15, characterized in that the aqueous solution consisting of the cationic surface active agent and non-ionic surface active agent is applied to the glass so as to wash the glass surface, and this washing step is followed by a step of rinsing with water before the glass is dried.

17. A method of treating flat glass according to claim 15, characterized in that the cationic surface active agent is one which is positively charged in the aqueous solution.

18. A method of treating flat glass according to claim 17, characterized in that the cationic surface active agent is a quaternary ammonium salt.

19. A method of treating flat glass according to claim 18, characterized in that the cationic surface active agent is an alkyl dimethyl benzyl ammonium chloride.

20. A method of treating flat glass according to claim 15, characterized in that the solution contains from 0.001% to 2% of the cationic surface active agent.

21. A method of treating flat glass according to claim 15, characterized in that the solution contains on the order of 0.02% by volume of the cationic surface active agent.

22. A method of treating flat glass according to claim 21, characterized in that a concentrated, substantially 10% by volume, solution of the cationic surface active agent is metered into a treatment solution supply tank at a dilution ratio of substantially 1:500.

23. A method of treating flat glass according to claim 15, characterized in that, at the treatment station, the solution of surface active agents is applied to both major surfaces of the glass.

* * * * *

UNITED STATES PATENT AND TRADEMARK OFFICE
CERTIFICATE OF CORRECTION

PATENT NO. : 4,544,395

DATED : October 1, 1985

INVENTOR(S) : Evans

It is certified that error appears in the above-identified patent and that said Letters Patent is hereby corrected as shown below:

On the title page insert

-- [30] Foreign Application Priority Data
August 17, 1978 [GB] United Kingdom----------33753/78 --.

Signed and Sealed this

Fourth Day of March 1986

[SEAL]

Attest:

DONALD J. QUIGG

Attesting Officer

Commissioner of Patents and Trademarks